(12) United States Patent
Klein

(10) Patent No.: US 11,279,484 B2
(45) Date of Patent: Mar. 22, 2022

(54) UNMANNED WINGED AIRCRAFT FOR AUTONOMOUS FIRE EXTINGUISHING

(71) Applicant: Joseph Klein, Chatsworth, CA (US)

(72) Inventor: Joseph Klein, Chatsworth, CA (US)

(73) Assignee: Joseph Klein, Chatsworth, CA (US)

( * ) Notice: Subject to any disclaimer, the term of this patent is extended or adjusted under 35 U.S.C. 154(b) by 323 days.

(21) Appl. No.: 16/259,297

(22) Filed: Jan. 28, 2019

(65) Prior Publication Data

US 2020/0239140 A1    Jul. 30, 2020

(51) Int. Cl.
  *B64D 1/18* (2006.01)
  *B64C 39/02* (2006.01)
  *A62C 3/02* (2006.01)

(52) U.S. Cl.
  CPC .............. *B64D 1/18* (2013.01); *A62C 3/0242* (2013.01); *B64C 39/024* (2013.01); *B64C 2201/128* (2013.01); *B64C 2201/141* (2013.01)

(58) Field of Classification Search
  CPC .......... B64D 1/16; B64D 1/18; A62C 3/0228; A62C 3/0242; B64C 39/024; B64C 2201/128; B64C 2201/141
  USPC ........................................................... 169/53
  See application file for complete search history.

(56) References Cited

U.S. PATENT DOCUMENTS

| | | | |
|---|---|---|---|
| 6,364,026 B1 * | 4/2002 | Doshay ................ | A62C 3/0271 169/36 |
| 2014/0000917 A1 * | 1/2014 | Stupakis ................ | B64C 39/02 169/53 |

\* cited by examiner

*Primary Examiner* — Christopher S Kim
(74) *Attorney, Agent, or Firm* — Burr & Forman, LLP

(57) ABSTRACT

An aircraft for unmanned firefighting may include a water tank fillable via a scoop operation during flight of the aircraft, and configured to be emptied by a release operation at a target of interest, a communications module configured to employ wireless communication via a ground link and/or a satellite link to provide real time or near real time communication with a remote configuration or monitoring facility, an imaging module configured to obtain image data at the target of interest for identifying updated target information, and a navigation module configured to enable remote or autonomous operation of the aircraft during the scoop operation and the release operation.

19 Claims, 3 Drawing Sheets

UNMANNED WINGED AIRCRAFT FOR AUTONOMOUS FIRE EXTINGUISHING

TECHNICAL FIELD

Example embodiments generally relate to unmanned equipment and, more particularly, relate to a system and apparatus for providing autonomous fire extinguishing with an unmanned, winged aircraft.

BACKGROUND

The concept of using aircraft to fight fires has been around for many years. In this regard, fixed-wing aircraft have been designed as airtankers or water bombers that can be filled with water and then deliver their payload on top of fires. Numerous aircraft of varying sizes have been outfitted for this task, with water capacities ranging from a few thousand gallons to as high as 19,000 gallons. Some of these airtankers are further designed to have a special capability for scooping water from the surface of a body of water (e.g., a river, lake, ocean or sea) and then flying to deliver the payload to a fire. This process can be repeated to deliver a relatively high quantity of water to fight a fire almost anywhere including in difficult terrain, or remote areas.

While these aircraft can be very valuable in relation to firefighting efforts, they typically require specially trained pilots that can be in short supply, and that have limitations on their flight hours. Thus, their availability and effectiveness can be limited.

Accordingly, it may be desirable to provide a system and or devices that are capable of performing unmanned fire extinguishing as described herein.

BRIEF SUMMARY OF SOME EXAMPLES

In one example embodiment, an aircraft for unmanned firefighting is provided. The aircraft may include a water tank fillable via a scoop operation during flight of the aircraft, and configured to be emptied by a release operation at a target of interest, a communications module configured to employ wireless communication via a ground link and/or a satellite link to provide real time or near real time communication with a remote configuration or monitoring facility, an imaging module configured to obtain image data at the target of interest for identifying updated target information, and a navigation module configured to enable remote or autonomous operation of the aircraft during the scoop operation and the release operation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
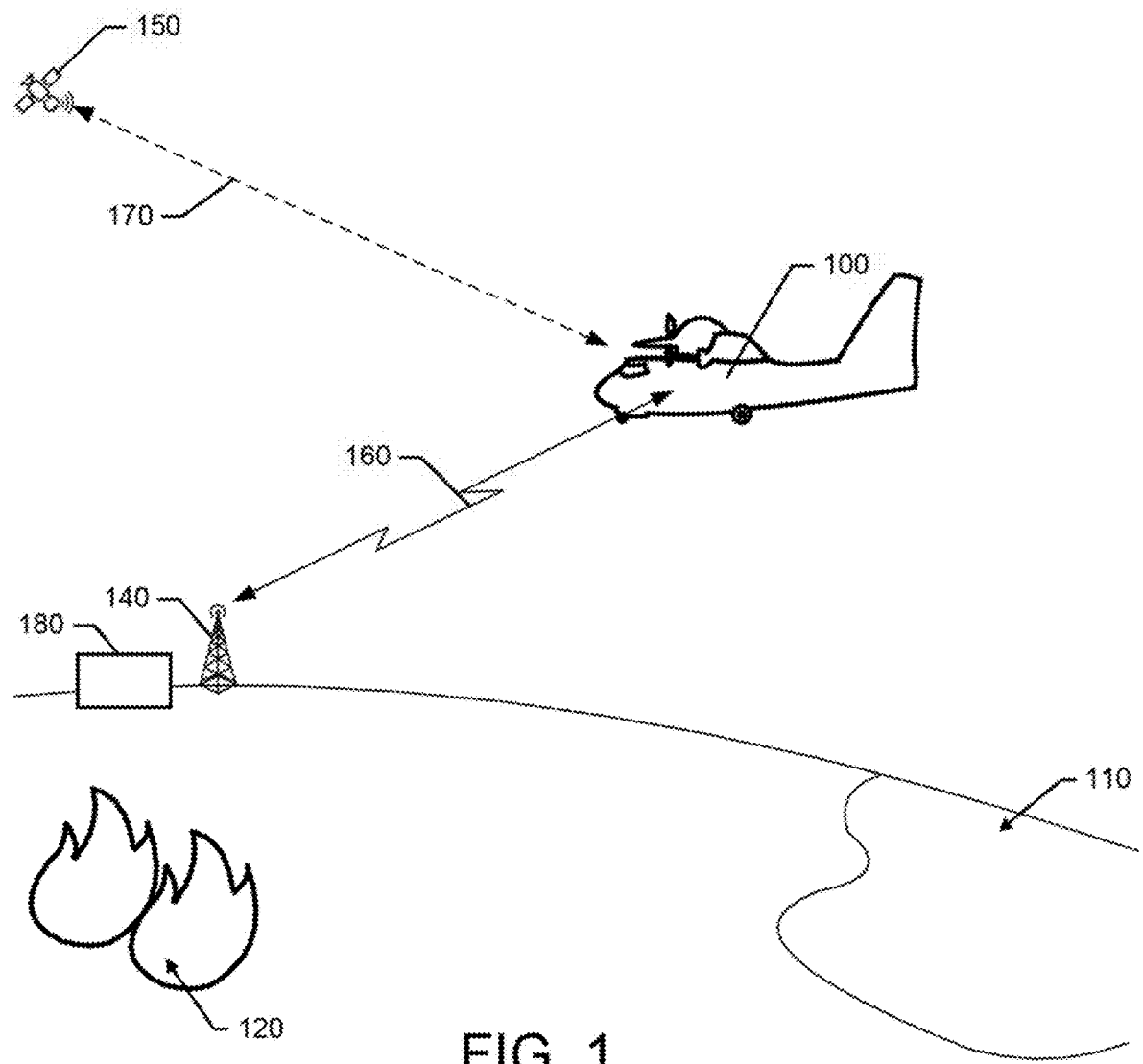
FIG. 1 illustrates a diagram of an environment in which an unmanned aircraft configured in accordance with an example embodiment may operate to perform fire extinguishing duties.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

As mentioned above, example embodiments may provide an improved ability to put water or other fire retardant liquids onto a target of interest (e.g., a fire) in a given area. To accomplish this, example embodiments may utilize the provision of adequate sensors and communications capabilities, along with the physical capability to scoop and deliver large volumes of water, on an aircraft that can be operated autonomously or remotely. In this regard, it should be noted that drone aircraft that have previously been associated with firefighting have been remote control operated, but have been used purely for reconnaissance and not for actual delivery of fire retardant fluids. In the limited examples in which fire retardant fluids have been delivered by drones, the water was generally carried aloft via a hose connection to the ground. This is both very limiting (due to the weight and length of the hose) in terms of range, and also very different than the type of unmanned operation described herein.

FIG. 1 illustrates a diagram of a context in which some example embodiments may be practiced. In this regard, FIG. 1 illustrates an aircraft 100 (e.g., a remotely piloted vehicle (RPV) or autonomous aerial vehicle (AAV)) that is configured to be able to scoop water from a body of water 110 (e.g., a lake, river, sea or ocean) in high volumes, and then deliver the water at a target of interest 120 (e.g., a location of a fire or potential fire) during unmanned operation. In some embodiments, the aircraft 100 may be configured to conduct each of a scoop operation and a release operation in about 12 seconds involving about 6 tons of water. The aircraft 100 may include an avionics module 130 that will be discussed in greater detail below. The avionics module 130 may be configured to enable the aircraft 100 to conduct the scoop operation, the release operation, and flying between the locations at which each of the scoop and release operations occur in either a, remote controlled, partially or fully autonomous manner. As such, the avionics module 130 may include sensors and control equipment to allow each of these operations to be conducted, and the flight path selected therebetween to be transited, without a need for a pilot onboard the aircraft 100.

The ability to fly between the body of water 100 and the target of interest 120 autonomously or under remote control, along with the ability to conduct the scoop operation and the release operation on target, are each unique and relatively complex problems. The aircraft 100 is configured to conduct these operations based on both the capabilities onboard (i.e., configured into the avionics module 130) and the communications capabilities of the aircraft 100, which may further enable remote configuration so that control instructions can be provided and/or modified during any of the scoop operation, the release operation or flying between the locations at which each of the scoop and release operations occur (i.e., the transit operation).

In an example embodiment, the aircraft 100 may be configured to include radio equipment or other communications equipment to enable in-flight communication with one or more ground stations 140 or satellites 150. As such, for example, the aircraft 100 may at all times, or at certain times, maintain an air-to-ground (ATG) wireless communication link 160 and/or a satellite wireless communication link 170. Moreover, the aircraft 100 may further include accurate global positioning system (GPS) location equipment to work with altimeter readings or other sensor equipment of the aircraft 100 to enable accurate three dimensional (3D) location information for the aircraft 100 to be determined at all times. In some cases, the ATG wireless communication link 160 and/or the satellite wireless communication link 170 may operably couple the aircraft 100 to a remote configuration and/or monitoring facility 180.

In some embodiments, the ground stations 140 may be erected in forested areas to enable line of sight communication with the aircraft 100. Thus, forestry management personnel may plan the locations of the ground stations 140 to ensure appropriate coverage of remote forested areas. However, in some embodiments, the ground stations 140 could be existing cellular towers or other tall structures that are equipped with radio equipment to enable communications with the aircraft 100. Moreover, in some cases, the ground stations 140 could be mobile towers that can be transported on a truck to a given location and then extended above the tree canopy to enable communications to be established with the aircraft 100.

The ATG wireless communication link 160 may be preferred in some cases, due to reduced latency relative to the satellite wireless communication link 170. Particularly for targets that are small or fast moving, latency may create issues for release. However, latency may also be problematic for control during the scooping operation, and takeoff or landing of the aircraft 100. Meanwhile, the satellite wireless communication link 170 may have an advantage of availability in certain remote areas where no ground link is available (or where such link is lost for any reason). For large fires, a delay in receipt of a release command may not make much difference in terms of effectiveness over the target of interest 120. As low earth orbit satellite constellations are built, and other satellites become more common and accessible, the satellite wireless communication link 170 may ultimately enable the aircraft 100 to operate as one entity within an internet of things (IOT) environment that includes RPV and/or AAV assets.

The remote configuration and/or monitoring facility 180 may be employed to provide instructions or information to the aircraft 100 (e.g., location of the target of interest 120 and/or the body of water 110). In this regard, in some cases the remote configuration and/or monitoring facility 180 may merely provide instructions or information to the aircraft 100, but otherwise allow the aircraft 100 to operate autonomously based on those instructions. This autonomous mode of operation may be monitored continuously by personnel located at the remote configuration and/or monitoring facility 180 to ensure appropriate operation of the aircraft 100 and to override any instructions (or provide new instructions) in case of emergency, or when modifications to prior instructions are deemed appropriate. However, the remote configuration and/or monitoring facility 180 can also be used by remote operators in a remote control mode of operation. During the remote control mode of operation, the remote operators may effectively have continuous communications with the aircraft 100 and control the operation of the aircraft 100 from the remote configuration and/or monitoring facility 180. In this regard, the ATG wireless communication link 160 and/or the satellite wireless communication link 170 may be used to provide sensor information from the aircraft 100 to the remote configuration and/or monitoring facility 180 and further enable the remote operators to provide control instructions to the aircraft 100.

Figure 2:
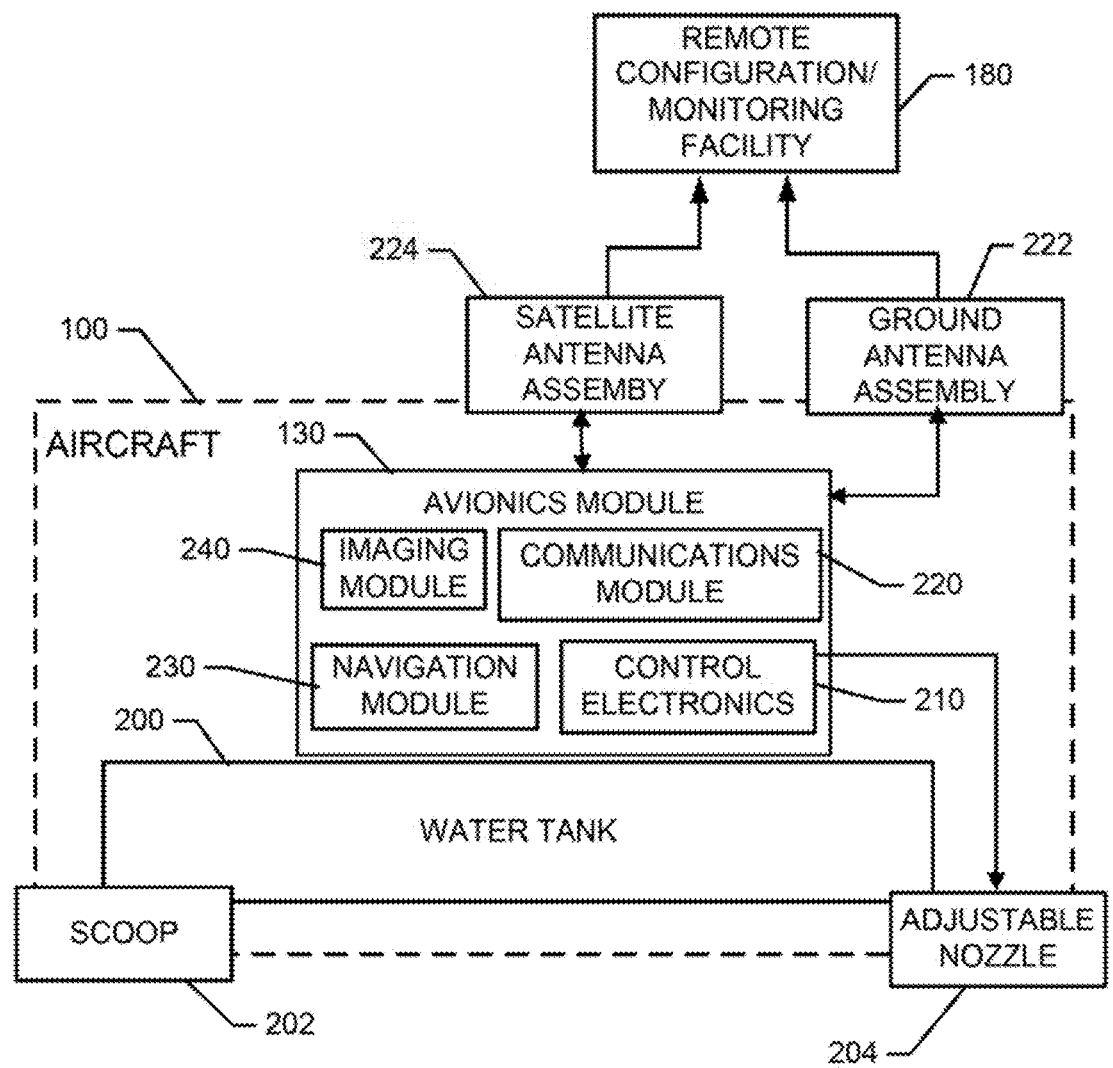
FIG. 2 illustrates a block diagram of the aircraft in accordance with an example embodiment.

FIG. 2 is a block diagram of several systems, components or modules of the aircraft 100 in accordance with an example embodiment. In this regard, the aircraft 100 may include a water tank 200 that is filled via the scoop 202 (e.g., during the scoop operation) and emptied via the adjustable nozzle 204 (e.g., during the release operation). The water tank 200 may be located and designed to have a size and shape that avoid any balance issues for the aircraft 100. Thus, the center of gravity of the aircraft 100 should remain relatively stable in either a loaded or unloaded condition. Meanwhile, the scoop 202 is generally located at a front portion of the aircraft 100 or the water tank 200 and the adjustable nozzle 204 is generally located at a rear portion of the aircraft 100 or the water tank 200.

The scoop 202 may be operable during the scoop operation to load water into the water tank 200. As noted above, in some cases the water tank 200 may have a capacity of about 6 tons, and may be loaded via the scoop 202 in about 12 seconds of contact with the surface of the body of water 110. Meanwhile, it should be appreciated that the common approach to conducting the release operation is simply to open a release valve (which is generally rather large) so that the water in the water tank 200 is allowed to drain by gravity and fall to the ground in large volumes nearly as fast as the water was scooped (e.g., emptying the contents in 12 seconds or less). However, example embodiments may employ the adjustable nozzle 204 to allow different release modes to be employed during the release operation.

In one such release mode, the conventional release (i.e., effectively dumping the water out of the water tank 200) method may be employed. As such, for example, the adjustable nozzle 204 may be fully opened to allow water to rapidly drain out of the water tank 200. Meanwhile, in at least one other mode, the adjustable nozzle 204 may employ louvers, grates, or other flow restricting structures to enable the water to be released in a finer spray or mist. As can be appreciated from flow rate calculations, the volumetric flow rate (Q) can be calculated as the product of the cross sectional area (Pipe Radius –r) for flow and the average flow velocity (i.e., $Q=((\Box \times r^2) \times v)$. (v=velocity can be calculated pending on the installation if the outlet operates on pressure P that is due to gravity or a water pump than $v=1.414\sqrt{P}$) Accordingly, the size of the orifices in the adjustable nozzle 204 can control the application of water from the water tank 200.

Of course, restricting flow from the water tank 200 may prolong the time of release, which may require multiple passes over the target of interest 120 before full emptying of the water tank 200 can be achieved. However, providing the capability to throttle release and control the volume of water release may also greatly enhance the effectiveness of aircraft 100 for certain operations. In this regard, for example, although the target of interest 120 may be a forest fire or at least a fire in a remote natural location in many cases, it is possible to also employ the aircraft 100 in connection with structure fires or locations where people may be located. If the conventional release mode were employed in such a situation, heavy damage may be inflicted on the structure by the weight and volume of water. Moreover, the structure may be damaged more heavily or completely by the water dropped thereon, than by the fire itself. Similarly, if the conventional release mode were employed in the presence of personnel (or animals) severe injury or death could be expected. However, when throttled water release is employed, a spray or mist may be expected to do much less damage to structures, and may be safe for people and/or animals. As such, the adjustable nozzle 204 may be employed to modify the aircraft 100 for use in different deployment contexts (e.g., rural or urban). Thus, wide ranging structure fires, structure fires involving tall buildings, or even fires involving firefighters or potential victims at risk can be targeted by the aircraft 100. Firefighters that may otherwise become trapped by an out of control wild fire can therefore be targeted by the aircraft 100 with one or multiple drops of a fine mist or spray of water being applied from above. Moreover, the aircraft 100 can be employed to target fires (or potential fires) where rioters, demonstrators, saboteurs, terrorists or even military personnel (friend and/or foe) may be located at the target of interest 120, but avoidance of lethal results of the water drop are strongly desired.

The adjustable nozzle 204 may be controlled to allow conventional release or throttled release by control electronics 210 that may be a part of or otherwise in communication with the avionics module 130 of the aircraft 100. In some embodiments, the control electronics 210 may be configured to select either the conventional release mode or throttled release mode during the transit operation (i.e., before the release operation), so that the appropriate method of release (and therefore also the number of releases before another scoop operation) and corresponding flight paths to achieve the appropriate method of release can be coordinated. In some cases, louvers, grates or other path restriction structures may be inserted or removed from the release path to transition between the conventional release mode and the throttled release mode. However, in other cases, separate release paths may exist for each respective mode. Although the two modes (conventional and throttled) may be distinct, some embodiments may allow the throttled release mode to have further selectability relative to the sizes of pressure by a pump and or pipe diameter or orifices used for release and therefore also a corresponding adjustment of flow rate and/or droplet size for the spray or mist that is generated. Thus, the throttled release mode may be a single discrete setting, or may be a setting with corresponding adjustability for flow rate and/or droplet size over a continuous range of (discrete or non-discrete) settings.

As shown in FIG. 2, the avionics module 130 may further include a communications module 220. The communications module 220 may include or otherwise be operably coupled to a ground antenna assembly 222 and/or a satellite antenna assembly 224. The ground antenna assembly 222 and the satellite antenna assembly 224 may each include one or more antennas that are configured for transmitting and receiving signals via the ATG wireless communication link 160 and the satellite wireless communication link 170, respectively. Thus, the ground antenna assembly 222 and the satellite antenna assembly 224 may each be enabled to communicate with the remote configuration and/or monitoring facility 180. In some cases, the ATG wireless communication link 160 and/or the satellite wireless communication link 170 may employ frequency bands such as 450 and 900 MHz. However, all LTE frequencies could be employed, and even VHF or other approved frequency bands may be employed as an alternative or for redundancy. In some examples, the ATG wireless communication link 160 and/or the satellite wireless communication link 170 may be encrypted for further security.

The avionics module 130 may further include a navigation module 230 and an imaging module 240. The imaging module 240 may include optical imaging cameras, laser scanning, forward looking infrared (FLIR) or other assets to facilitate the application of sensors in low light/visibility (or no light/visibility) environments to detect the location and movement of fires at the target of interest 120. In this regard, for example, heat detection may be employed to allow the location of the actual fire to be determined so that the hot spots or edges of the fire can be specifically located and/or targeted. The imaging module 240 may therefore provide real time situational awareness for remote operators or monitors located at the remote configuration and/or monitoring facility 180 and/or to the navigation module 230 and control electronics 210 for coordination of flight operations to conduct either or each of the scoop operation, the transit operation or the release operation.

In some examples, an operator or monitor located at the remote configuration and/or monitoring facility 180 may input coordinates of the body of water 110 and the target of interest 120. For autonomous operation, the aircraft 100 (e.g., via the navigation module 230) may use the coordinates to determine flight paths between the body of water 110 and the target of interest 120 and may the control electronics 210 may be used to provide inputs to control surfaces and the engine power to fly the corresponding flight paths. As the body of water 110 is approached, the navigation module 230 may employ the imaging module 240 to identify and select a clear area at which to conduct the scoop operation. In this regard, the navigation module 230 may be configured to determine a size of area based on wind and wave conditions at which to conduct the scoop operation while avoiding any surface traffic on the body of water 110. Altimeter information may be continuously fed to the navigation module 230 enable the control electronics 210 to interface with control surfaces and the engine to lower altitude until the surface of the body of water is contacted. Contact may be sensed (e.g., by inertial sensors and/or the imaging module 240) and a timer may be started. As an example, after about 12 seconds of contact, the aircraft 100 may be controlled to regain altitude and fly toward the target of interest 120 (e.g., based on a latest information report or the last location from a prior release operation). As the target of interest 120 is approached, the imaging module 240 may be employed to isolate a more detailed location to be targeted by the release operation. The adjustable nozzle 204 may also be adjusted for the mode of release that is desired (e.g., conventional or throttled), and the mode of release, wind speed, direction of approach and specific location of the fire may all be considered by the navigation module 230 and the imaging system to determine a start and stop location/time for initiation of the release operation. The start and stop location/time for initiation of the release operation may consider the altitude of the aircraft, wind speed, speed of the aircraft, and the detailed location of the target. The release mode may also impact the start and stop location/time. Considering all of these factors, and any other pertinent factors, the navigation module 230 may provide information to the control electronics 210 for control surface and engine control to get the aircraft 100 to achieve the desired approach. Then the control electronics 210 may operate the adjustable nozzle 204 to actually release the water on target.

Alternatively, of course, the remote operator may provide real time (or near real time) instructions to the aircraft 100 to operate control surfaces and the engine power to do the same operations described above. However, in this example, the aircraft 100 is controlled remotely instead of autonomously. Thus, for example, the imaging module 240 may provide video or other image data to the remote operator or monitor and also to the navigation module 230 and control electronics 210 so that all such information may be used to enable the remote operator to provide instructions to the aircraft 100. The remote control may be conducted using real-time (or near real time) information provided from the aircraft 100 on 3D location of the aircraft 100 and on all sensor data that is captured at the aircraft 100. The remote operator may then provide instructions to the aircraft 100 via the ATG wireless communication link 160 and/or the satellite wireless communication link 170 to achieve the same functions that are otherwise described above in an autonomous control context.

It should also be understood that the two scenarios described above can be integrated to whatever degree possible or desired in some cases. Moreover, a shift can be made during operation between autonomous or remote control. During autonomous operation, the remote operator may instead become a monitor and simply provide supervision for operation of the aircraft 100. However, the remote monitor may also provide updated instructions (e.g., to change the body of water 110 location and/or the target of interest 120, or to change the release mode), but otherwise monitor operation without active interaction. In either case, the remote operator or monitor may rely on external reports or information and/or real time information provided by the aircraft 100 (and its sensors) to make decisions regarding operation of, or instructions for, the aircraft 100.

Figure 3:
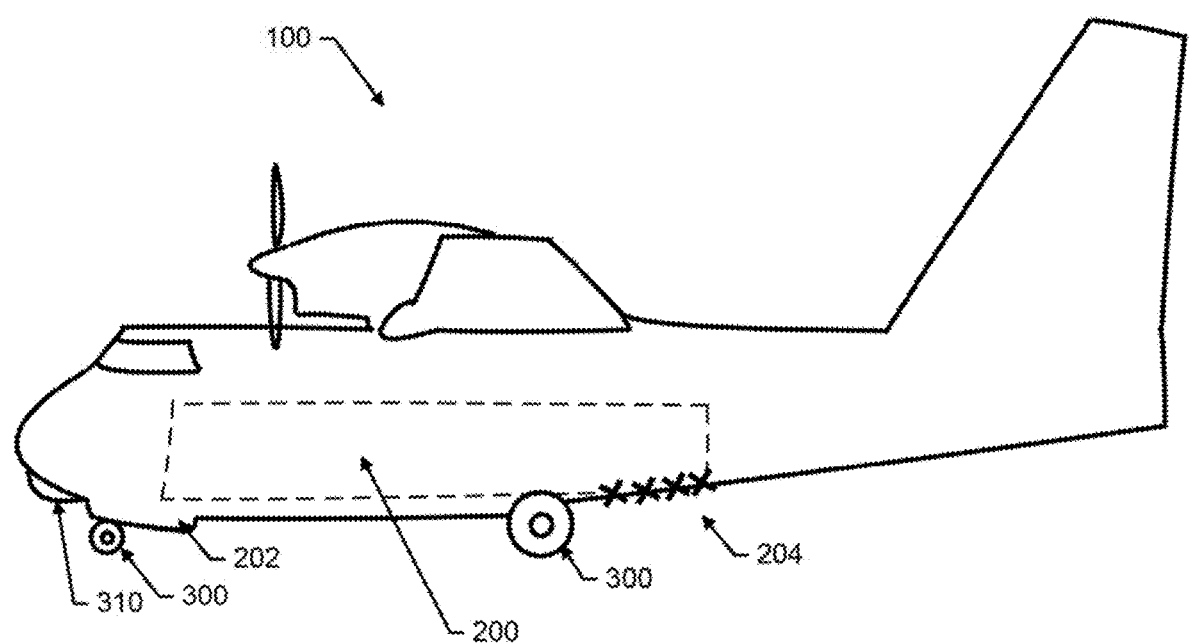
FIG. 3 illustrates a diagram of the aircraft according to an example embodiment.

FIG. 3 illustrates one example of the aircraft 100 according to an example embodiment. The aircraft 100 of FIG. 3 is a fixed wing aircraft. However, it should be appreciated that example embodiments could also be employed using helicopters in some cases. The aircraft 100 includes the water tank 200 along with the scoop 202 and adjustable nozzle 204 located at bottom portions of the aircraft 100. The flow restricting structures of the adjustable nozzle 204 are represented by the "X" markings on the bottom of the aircraft 100. Meanwhile, wheels 300 of the aircraft 100 may be retractable during flight to avoid interference with the scoop operation. The sensor housing 310 located at the front of the aircraft 100 may include components of the imaging module 240.

In some example embodiments, the aircraft 100 of FIGS. 1-3 may provide a mechanism via which unmanned aircraft can be used to perform fire extinguishing functions. Thus, an aircraft of an example embodiment may include a water tank fillable via a scoop operation during flight of the aircraft, and configured to be emptied by a release operation at a target of interest, a communications module configured to employ wireless communication via a ground link and/or a satellite link to provide real time or near real time communication with a remote configuration or monitoring facility, an imaging module configured to obtain image data at the target of interest for identifying updated target information, and a navigation module configured to enable remote or autonomous operation of the aircraft during the scoop operation and the release operation.

In some embodiments, the aircraft (and corresponding devices or components thereof) may include additional features, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, a scoop may be disposed at a front portion of the water tank and an adjustable nozzle may be disposed at a rear portion of the water tank. The scoop and the adjustable nozzle may be configured to enable water to be loaded into and released from the water tank, respectively, at a rate of about 6 tons in 12 seconds. In an example embodiment, the adjustable nozzle may include flow restricting structures configured to enable a spray or mist of water to be released from the water tank. In some cases, the adjustable nozzle may have a single discrete throttled flow rate setting. Alternatively, the adjustable nozzle may have multiple throttled flow rate settings. In an example embodiment, the aircraft may include control electronics configured to interface with the flow restricting structures in-flight to adjust the flow rate from the water tank. In some cases, the aircraft may be controllable remotely by a remote operator at the remote configuration or monitoring facility using a command control interface provided by the ground link and/or the satellite link. In various alternatives, the ground link and/or the satellite link may be encrypted. In an example embodiment, the imaging module may include night imaging to facilitate low visibility operation of the aircraft. Alternatively or additionally, the imaging module may include thermal imaging to facilitate detailed location of a fire at the target of interest and flow rate. In some cases, the imaging module may be configured to interface with the navigation module to enable night scooping and night release. In an example embodiment, coordinates of the body of water and the target of interest may be inserted from the remote configuration or monitoring facility, and the navigation module may be configured to determine flight paths between the body of water and the target of interest autonomously. In some cases, the navigation module may be further configured to utilize information from the imaging module to determine an updated location of a fire at the target of interest, and to determine a start time or location and stop time or location for the release operation based on the updated location and based on wind speed, aircraft speed and altitude. In some cases, the ground link may be established with one or more transmission towers erected for line-of-sight communication covering a fixed geographic location. Alternatively or additionally, the ground link may be established with one or more transmission towers associated with cellular communications. Alternatively or additionally, the ground link may be established with one or more transmission towers that are mobile. In an example embodiment, the imaging module may be configured to employ fire tracking to dynamically update fire location for determination of a priority location at which to conduct the release operation. In some cases, the aircraft may be a helicopter or a fixed wing aircraft.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An aircraft for unmanned firefighting, the aircraft comprising:
   a water tank fillable via a scoop operation conducted at a body of water during flight of the aircraft, and configured to be emptied by a release operation at a target of interest;
   a communications module configured to employ wireless communication via a ground link and/or a satellite link to provide real time or near real time communication with a remote configuration or monitoring facility;
   an imaging module configured to obtain image data at the target of interest for identifying updated target information; and
   a navigation module configured to enable remote or autonomous operation of the aircraft during the scoop operation and the release operation,
   wherein a scoop is disposed at a front portion of the water tank and an adjustable nozzle is disposed at a rear portion of the water tank.

2. The aircraft of claim 1, wherein the scoop and the adjustable nozzle are configured to enable water to be loaded into and released from the water tank, respectively, at a rate of about 6 tons in 12 seconds.

3. The aircraft of claim 1, wherein the adjustable nozzle comprises flow restricting structures configured to enable a spray or mist of water to be released from the water tank.

4. The aircraft of claim 3, wherein the adjustable nozzle has a single discrete throttled flow rate setting.

5. The aircraft of claim 3, wherein the adjustable nozzle has multiple throttled flow rate settings.

6. The aircraft of claim 3, wherein the aircraft comprises control electronics configured to interface with the flow restricting structures in-flight to adjust the flow rate from the water tank.

7. The aircraft of claim 1, wherein the aircraft is controllable remotely by a remote operator at the remote configuration or monitoring facility using a command control interface provided by the ground link and/or the satellite link.

8. The aircraft of claim 7, wherein the ground link and/or the satellite link is encrypted.

9. The aircraft of claim 1, wherein the imaging module comprises night imaging to facilitate low visibility operation of the aircraft.

10. The aircraft of claim 1, wherein the imaging module comprises thermal imaging to facilitate detailed location of a fire at the target of interest and flow rate.

11. The aircraft of claim 1, wherein the imaging module is configured to interface with the navigation module to enable night scooping and night release.

12. The aircraft of claim 1, wherein coordinates defining a geographic location of each of the body of water and the target of interest are provided to the navigation module from the remote configuration or monitoring facility, and
   wherein the navigation module is configured to determine flight paths between the body of water and the target of interest autonomously.

13. The aircraft of claim 12, wherein the navigation module is further configured to utilize information from the imaging module to determine an updated location of a fire at the target of interest, and to determine a start time or location and stop time or location for the release operation based on the updated location and based on wind speed, aircraft speed and altitude.

14. The aircraft of claim 1, wherein the communications module is configured to communicate via the ground link, the ground link being established with one or more transmission towers erected for line-of-sight communication covering a fixed geographic location.

15. The aircraft of claim 1, wherein the communications module is configured to communicate via the ground link, the ground link being established with one or more transmission towers associated with cellular communications.

16. The aircraft of claim 1, wherein the communications module is configured to communicate via the ground link, the ground link being established with one or more transmission towers that are mobile.

17. The aircraft of claim 1, wherein the imaging module is configured to employ fire tracking to dynamically update fire location for determination of a priority location at which to conduct the release operation.

18. The aircraft of claim 1, wherein the aircraft is a helicopter.

19. The aircraft of claim 1, wherein the aircraft is a fixed wing aircraft.

* * * * *